(12) United States Patent
Feldtkeller et al.

(10) Patent No.: US 10,707,745 B2
(45) Date of Patent: Jul. 7, 2020

(54) PHASE CONTROLLED DISCHARGING OF INTERNAL CAPACITIVE ELEMENT OF POWER SUPPLY CIRCUIT

(71) Applicant: Infineon Technologies Austria AG, Villach (AT)

(72) Inventors: Martin Feldtkeller, Munich (DE); Torsten Hinz, Augsburg (DE); Jens Barrenscheen, Munich (DE); Reinhard Mueller, Unterhaching (DE); Anthony Sanders, Weissenfeld (DE)

(73) Assignee: Infineon Technologies Austria AG, Villach (AT)

( * ) Notice: Subject to any disclaimer, the term of this patent is extended or adjusted under 35 U.S.C. 154(b) by 122 days.

(21) Appl. No.: 16/005,110

(22) Filed: Jun. 11, 2018

(65) Prior Publication Data

US 2018/0358890 A1 Dec. 13, 2018

(30) Foreign Application Priority Data

Jun. 12, 2017 (DE) .................. 10 2017 112 848

(51) Int. Cl.
*H02M 1/32* (2007.01)
*H02M 7/06* (2006.01)
*H02M 3/22* (2006.01)
*H02M 1/00* (2006.01)

(52) U.S. Cl.
CPC .............. *H02M 1/32* (2013.01); *H02M 7/06* (2013.01); *H02M 3/22* (2013.01); *H02M 2001/0009* (2013.01); *H02M 2001/322* (2013.01)

(58) Field of Classification Search
CPC ............ H02M 1/32; H02M 7/06; H02M 3/22; H02M 2001/0009; H02M 2001/322
USPC ..................... 363/15, 18, 125–127
See application file for complete search history.

(56) References Cited

U.S. PATENT DOCUMENTS

| 7,656,103 B2* | 2/2010 | Shteynberg | H05B 33/0815 315/312 |
| 8,487,539 B2* | 7/2013 | Kuroki | H05B 33/0848 315/209 R |
| 2012/0112564 A1 | 5/2012 | Wu et al. | |
| 2012/0200233 A1* | 8/2012 | Pauritsch | H01L 41/044 315/279 |
| 2014/0184145 A1 | 7/2014 | Degen et al. | |
| 2016/0097638 A1* | 4/2016 | Fedigan | G01C 9/06 324/71.1 |

FOREIGN PATENT DOCUMENTS

| DE | 102015102116 A1 | | 8/2015 |
| JP | 2013128372 A | * | 6/2013 |
| JP | 2015053228 A | * | 3/2015 |

* cited by examiner

*Primary Examiner* — Jue Zhang
*Assistant Examiner* — Nusrat Quddus
(74) *Attorney, Agent, or Firm* — Murphy, Bilak & Homiller, PLLC

(57) ABSTRACT

A power supply circuit is equipped with a converter circuit configured to convert an alternating current signal applied at an input of the power supply circuit into a direct current signal. A control circuit for the power supply circuit is configured to detect a phase of the alternating current signal and to control discharging of an internal capacitive element of the power supply circuit based on the detected phase of the alternating current signal.

35 Claims, 9 Drawing Sheets ered zero crossings of the AC signal. The detected phase of the AC signal may then be used to determine the times of the expected zero crossings.

According to an embodiment, the sensing of the AC signal comprises:

in a first time interval in which a zero crossing of the AC signal is expected, coupling a sense resistor to the input of the power supply circuit, and in a second time interval in which no zero crossing of the AC signal is expected, decoupling the sense resistor from the input of the power supply circuit.

According to an embodiment, the discharging of the internal capacitive element comprises coupling of the sense resistor to the input of the power supply circuit.

According to an embodiment, the internal capacitive element comprises a filter capacitor coupled between a first terminal and a second terminal of the input of the power supply circuit.

According to an embodiment, the control circuit is configured to trigger discharging of the filter capacitor in response to not detecting an expected zero crossing of the AC signal.

According to an embodiment, the converter circuit is configured to provide the DC signal to an output of the power supply circuit, and the internal capacitive element comprises a capacitive element between a terminal of the output of the power supply circuit and an internal ground of the power supply circuit. The capacitive element between the terminal of the output of the power supply circuit and the internal ground of the power supply circuit may comprise a filter capacitor coupled between the terminal of the output of the power supply circuit and the internal ground of the power supply circuit. Alternatively or in addition, the capacitive element between the terminal of the output of the power supply circuit and the internal ground of the power supply circuit may comprise a parasitic capacitance.

According to an embodiment, the control circuit is configured to trigger discharging of the capacitive element between the terminal of the output of the power supply circuit and the internal ground of the power supply circuit in multiple distinct time intervals arranged between a minimum value and a zero crossing of the AC signal.

According to an embodiment, the control circuit is configured to discharge the capacitive element between the terminal of the output of the power supply circuit and the internal ground of the power supply circuit by coupling the internal ground of the power supply circuit to a ground terminal of the input of the power supply circuit. This coupling to the ground terminal of the input of the power supply circuit may be accomplished through a sense resistor for monitoring the AC signal.

According to an embodiment, the control circuit is configured to discharge the capacitive element between the terminal of the output of the power supply circuit and the internal ground of the power supply circuit through a current limiting switch circuit. The current limiting switch circuit may comprise a current sink configured to be selectively switched into a discharge path of the capacitive element between the terminal of the output of the power supply circuit and the internal ground of the power supply circuit.

According to a further embodiment, a power supply circuit is provided. The power supply circuit comprises a control circuit according to any one of the above-described embodiments and the converter circuit.

According to a further embodiment, a method of controlling a power supply circuit is provided. The method comprises converting an AC signal applied at an input of the

PHASE CONTROLLED DISCHARGING OF INTERNAL CAPACITIVE ELEMENT OF POWER SUPPLY CIRCUIT

TECHNICAL FIELD

The present application relates to a control circuit for a power supply circuit, to a power supply circuit and to a method of controlling a power supply circuit.

BACKGROUND

For supplying electronic devices with power, it is known to utilize power supplies which convert an alternating current (AC) voltage, e.g., a mains voltage of 230 V or 120 V, into a lower direct current (DC) voltage, e.g., a DC voltage of 3.3 V, 5 V, 9 V, or 12 V, as required for supplying various electronic devices. For this purpose, the power supply may include a converter circuit which is based on a bridge rectifier, signal filters and a DC-DC converter. The circuit components typically include one or more capacitors which are charged during operation of the power supply circuit.

The charging of the capacitor(s) may have the effect that, when the user plugs off the power supply, the capacitor may be charged at a high voltage level of 100 V or more, which may constitute a significant risk for a person touching a contact of the power supply, because the capacitor may then discharge through the person's body. In view of this situation, security standards have been implemented which require that the power supply is equipped with a mechanism to quickly discharge the capacitor after the power supply being plugged off.

Such mechanism may involve passive discharging through a resistor which is permanently connected in parallel to the capacitor. However, this mechanism may result in increased power consumption, especially when the power supply operates under low load or no load, because there is additional current dissipation in the resistor. Further, such mechanism may involve active discharging by activating a discharge path in response to detecting that the AC voltage is no longer present at the input of the power supply. Also in this case, power consumption increases due to the monitoring of the AC voltage at the input of the power supply circuit.

Accordingly, there is a need for techniques which allow efficient discharging of an internal capacitive element of a power supply circuit.

SUMMARY

According to an embodiment, a converter circuit for a power supply circuit is provided. The power supply circuit comprises a converter circuit configured to convert an AC signal applied at an input of the power supply circuit into a DC signal. The control circuit is configured to detect a phase of the AC signal and to control discharging of an internal capacitive element of the power supply circuit based on the detected phase of the AC signal. The internal capacitive element may comprise a filter capacitor and/or a parasitic capacitance.

According to an embodiment, the control circuit is configured to detect the phase by monitoring zero crossings of the AC signal.

According to an embodiment, the control circuit is configured to synchronize sensing of the AC signal with power supply circuit into a DC signal. Further, the method comprises detecting a phase of the AC signal and, based on the detected phase, controlling discharging of an internal capacitive element of the power supply circuit. The internal capacitive element may comprise a filter capacitor and/or a parasitic capacitance.

According to an embodiment, the method comprises detecting the phase by monitoring zero crossings of the AC signal.

According to an embodiment, the method comprises synchronizing sensing of the AC signal with expected zero crossings of the AC signal. The detected phase of the AC signal may then be used to determine the times of the expected zero crossings.

According to an embodiment, the sensing of the AC signal comprises:
   in a first time interval in which a zero crossing of the alternating current signal is expected, coupling a sense resistor to the input of the power supply circuit; and
   in a second time interval in which no zero crossing of the alternating current signal is expected, decoupling the sense resistor from the input of the power supply circuit.

According to an embodiment, the discharging of the internal capacitive element comprises coupling of the sense resistor to the input of the power supply circuit.

According to an embodiment, the internal capacitance comprises a filter capacitor coupled between a first terminal and a second terminal of the input of the power supply circuit. In this case, the method may comprise triggering the discharging of the filter capacitor in response to not detecting an expected zero crossing of the alternating current signal.

According to an embodiment, the DC signal is provided to an output of the power supply circuit, and the internal capacitive element comprises a capacitive element between a terminal of the output of the power supply circuit and an internal ground of the power supply circuit. The capacitive element between the terminal of the output of the power supply circuit and the internal ground of the power supply circuit comprises a filter capacitor coupled between the terminal of the output of the power supply circuit and the internal ground of the power supply circuit. In addition or as an alternative, the capacitive element between the terminal of the output of the power supply circuit and the internal ground of the power supply circuit may comprise a parasitic capacitance.

According to an embodiment, the method comprises triggering discharging of the capacitive element between the terminal of the output of the power supply circuit and the internal ground of the power supply circuit in multiple distinct time intervals arranged between a minimum value and a zero crossing of the AC signal.

According to an embodiment, the method comprises discharging the capacitive element between the terminal of the output of the power supply circuit and the internal ground of the power supply circuit by coupling the internal ground of the power supply circuit to a ground terminal of the input of the power supply circuit. This coupling to the ground terminal of the input of the power supply circuit may be accomplished through a sense resistor for monitoring the AC signal. Alternatively or in addition, the method may comprise discharging the capacitive element between the terminal of the output of the power supply circuit and the internal ground of the power supply circuit through a current limiting switch circuit. The current limiting switch circuit may comprise a current sink. The method may then comprise selectively switching the current sink into a discharge path of the capacitive element between the terminal of the output (113, 114) of the power supply circuit and the internal ground of the power supply circuit.

The above summary is merely intended to give a brief overview over some embodiments and is not to be construed as limiting, as other embodiments may employ other features.

DETAILED DESCRIPTION

Figure 1:
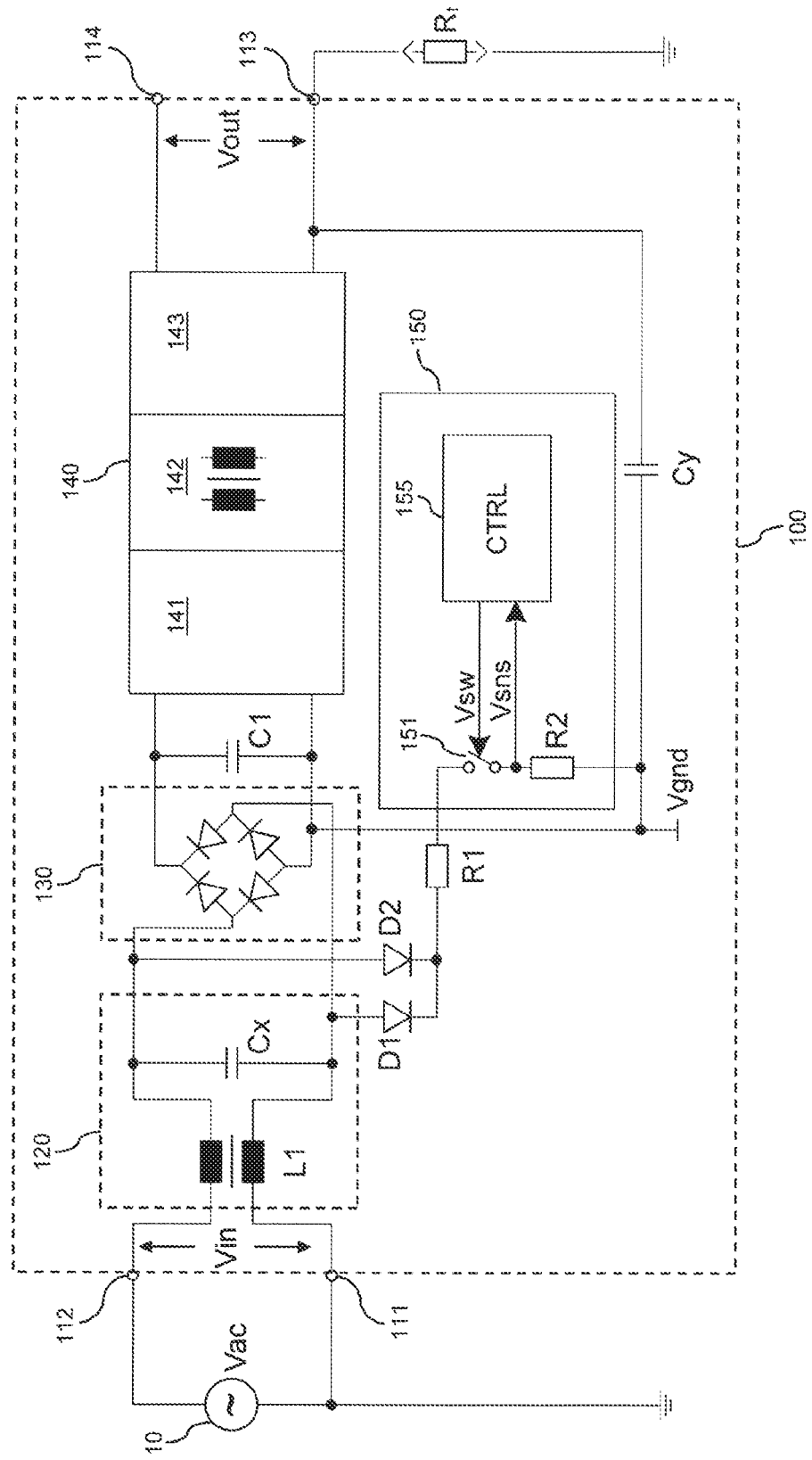
FIG. 1 illustrates a power supply circuit having a control circuit according to an embodiment.

In the following, various embodiments will be discussed referring to the attached drawings. It should be noted that these embodiments are given as illustrative examples only and are not to be construed as limiting. For example, while embodiments may be described as comprising a plurality of features or elements, this is not to be construed as indicating that all these features or elements are necessary for an implementation. Instead, in other embodiments, some of these features or elements may be omitted, and/or may be replaced by alternative features or elements. In addition to the features or elements explicitly shown in the drawings or described herein, other features or elements, for example features or elements used in conventional power supply circuits, may be provided.

FIG. 1 illustrates a power supply circuit 100 according to an embodiment. As illustrated, the power supply circuit 100 has an input with terminals 111, 112, and an output with terminals 113, 114. The terminals 111, 112 are connected to an AC source 10 which provides an AC signal Vac. The AC source 10 may for example correspond to an AC mains voltage of 230 V or 120 V. During normal operation of the power supply circuit 100, the AC signal Vac thus constitutes an input signal Vin of the power supply circuit. As further illustrated, the terminal 111 is connected to an external earth potential. Accordingly, the terminal 111 may be regarded as a ground terminal of the input of the power supply circuit 100. At its output, the power supply circuit provides a DC signal Vout having a lower voltage level than the AC signal Vac provided by the AC source 10, i.e., a lower DC voltage level than an effective voltage of the AC signal. For example, the DC signal provided at the output of the power supply circuit could be a DC voltage of 12 V, 9 V, 5 V, or 3.3 V. With reference to the DC signal Vout, the terminal 113 is assumed to be on a lower potential, and may thus be regarded as a ground terminal of the output of the power supply circuit 100.

For generating the DC signal Vout from the AC signal Vac, the power supply circuit 100 is provided with a converter circuit which in the illustrated example is based on an input filter 120, a rectifier circuit 130, and a DC-DC converter circuit 140. As illustrated, the rectifier circuit 130 is implemented as a bridge rectifier formed of multiple diodes. As further illustrated, the DC-DC converter circuit 140 may have multiple stages, e.g., a switched capacitor circuit 141, e.g., based on a charge pump or Buck converter, a transformer circuit 142 for signal isolation, and an output circuit 143 for final conditioning of the DC signal Vout, e.g., by filtering.

In the illustrated example, the input filter 120 includes an inductor L1 and a filter capacitor Cx coupled between the terminals 111, 112 of the input of the power supply circuit 100. The input filter 120 may for example have the purpose of filtering electromagnetic interference (EMI) from the input signal Vin. As further illustrated, the input filter 120 may also include components arranged on an output side of the rectifier circuit 130, such as a further filter capacitor C1. It is noted that the configuration of the input filter 120 as illustrated in FIG. 1 is merely exemplary, and that for example more complex configurations could be used, e.g., including one or more additional inductors and/or capacitors.

As further illustrated, the power supply includes a capacitive element Cy between the ground terminal 113 of the output of the power supply circuit 100 and an internal ground Vgnd of the power supply circuit 100. The internal ground Vgnd is defined by the lower potential output branch of the rectifier circuit 130. The capacitive element Cy may be filter capacitor which has the purpose of filtering EMI from the DC signal Vout. However, it is noted that even if such filter capacitor is not provided as a discrete component, a parasitic capacitance would typically be present between the ground terminal 113 and the internal ground Vgnd of the power supply circuit 100. Accordingly, the capacitive element Cy may include a filter capacitor and/or a parasitic capacitance.

If in the power supply circuit 100 the AC source 10 is disconnected at a time when the AC signal Vac is at or close to its peak value, the filter capacitor Cx would be charged to a corresponding high voltage level, e.g., of 100 V or more. If in addition there is no or only low load connected to the output of the power supply circuit 100, the filter capacitor 100 would keep this voltage level for some time, with the risk of discharging through the body of a person touching one of the terminals 111, 112. In the power supply circuit 100 the risk of discharging through the body of a person touching one of the terminals 111, 112 is avoided by actively discharging the filter capacitor Cx when the power supply circuit 100 is disconnected from the AC source 10. This discharging of the filter capacitor Cx is controlled by a control circuit 150.

In the illustrated example, the discharge path includes a first diode D1 coupled to a first terminal of the filter capacitor Cx and a second diode D2 coupled to a second terminal of the filter capacitor Cx. Further, the discharge path includes a switch 151 and resistors R1, R2 which are coupled between the diodes D1, D2 and the internal ground Vgnd of the power supply circuit 100. The switch may for example be implemented by one or more MOS (Metal Oxide Semiconductor) transistors. If the switch 151 is closed, the filter capacitor may discharge by a current which flows through the resistors R1 and R2 to the internal ground Vgnd of the power supply circuit 100. Further, when the switch 151 is closed, a voltage Vsns across the resistor R2 may be used to monitor the input signal Vin for presence of the AC signal Vac. Accordingly, the resistor R2 may also be referred to as a sense resistor, and the voltage Vsns may be referred to as a sense voltage. As illustrated, the control circuit 150 includes a control logic 155 which receives the sense voltage Vsns and generates a switch control voltage Vsw for opening and closing the switch 151. The control logic 155 may for example be implemented as a microcontroller or an ASIC (Application Specific Integrated Circuit).

In the power supply circuit 100, the sensing of the AC signal Vac is used to trigger discharging of the filter capacitor Cx when the AC signal Vac is no longer present in the input signal Vin. This may be achieved by monitoring zero crossings of the AC signal Vac. Further, the sensing of the AC signal Vac is used to detect a phase of the AC signal Vac. The detected phase is then used to control active discharging processes in a manner which is synchronized to the phase. Specifically, the switch 151 may be closed during short time intervals where a zero crossing of the AC signal Vac is expected. During such time intervals, which may have a duration of 5-10% of a period of the AC signal or less, the voltage drop across the sense resistor R2 is low, and sensing of the AC signal Vac may thus be done with low power consumption. If the AC signal Vac is found to be not or no longer present in the input signal Vin, e.g., on the basis of an expected zero crossing not being detected, the control logic 155 keeps the switch 151 closed until the filter capacitor Cx or some other internal capacitive element is sufficiently discharged. Accordingly, discharging of the filter capacitor Cx or of other internal capacitive elements of the power supply circuit 100, such as the capacitance Cy, can be controlled in a highly efficient manner. This will now be further explained by referring to exemplary signals as illustrated in FIGS. 2 to 6.

Figure 2:
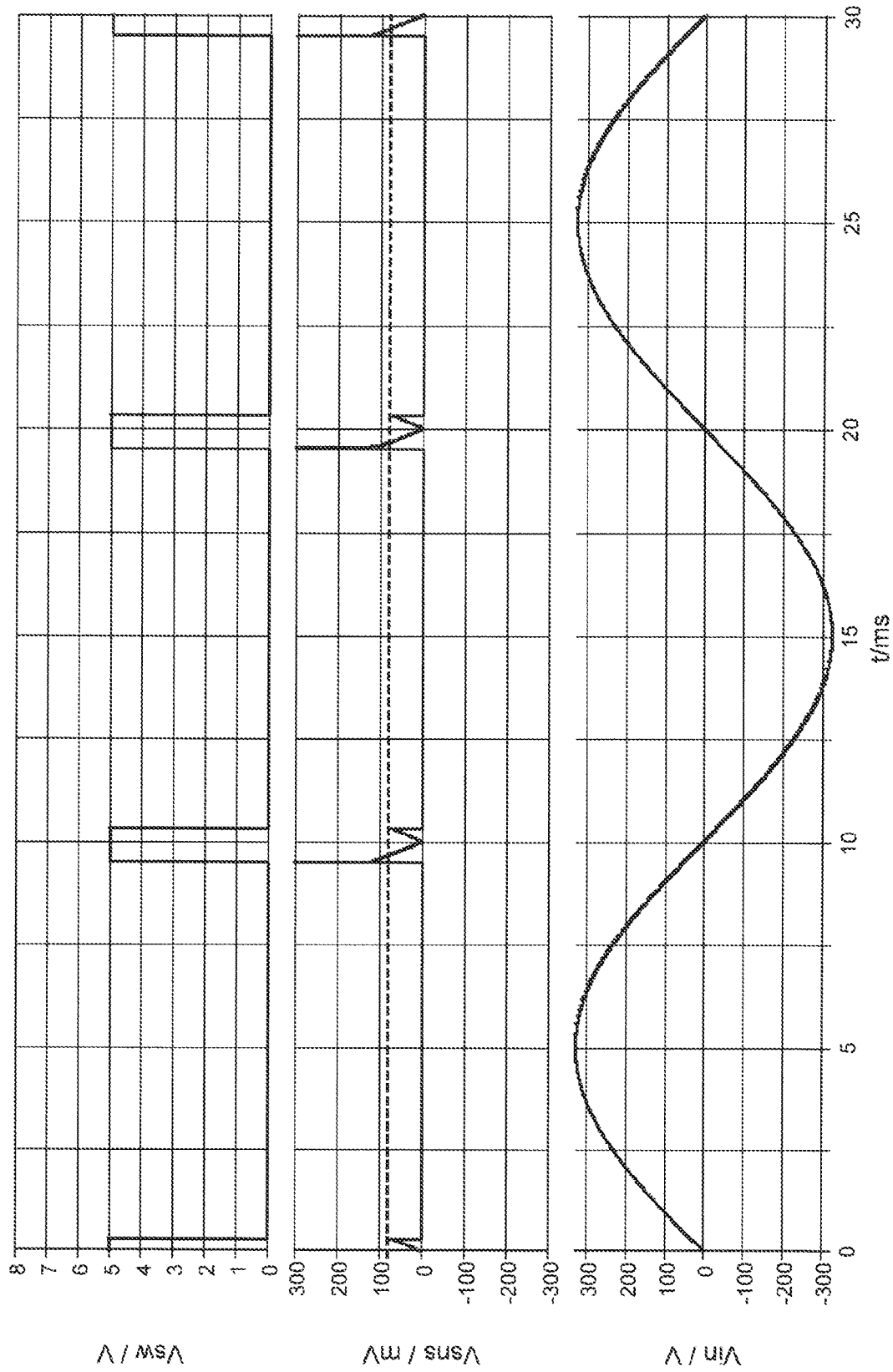
FIG. 2 shows an example of signals which may occur during operation of the power supply circuit.

FIG. 2 shows an example of signals which may occur during normal operation of the power supply circuit 100. In the example of FIG. 2, it is assumed that the AC source 10 is connected to the power supply circuit 100 and that the control logic 155 is already aware of the phase of the AC signal Vac. For this situation, FIG. 2 shows the input signal Vin, which then corresponds to the AC signal Vac, the sense voltage Vsns, and the switch control voltage Vsw as a function of time t. The example of FIG. 2 assumes that the AC signal Vac has a frequency of 50 Hz and a peak-to-peak amplitude of about 320 V, corresponding to a 230V AC mains voltage as for example used in many European countries.

As illustrated, the AC signal Vac has zero crossings at t=0 ms, t=10 ms, t=20 ms, and t=30 ms. At these points in time, the switch 151 is closed for a time interval of about 1 ms, the time interval having a center at about the time of the zero crossing. In other words, the switch 151 is closed shortly before the time of a zero crossing and reopened at the end of the time interval, shortly after the time of the zero crossing. For closing the switch 151, the control logic 155 generates a switch control voltage of Vsw=5V, otherwise the switch control voltage is kept at Vsw=0V. Accordingly, the switch 151 is actively closed to discharge the filter capacitor Cx. As can be seen, at the times of the zero crossings, the sense voltage Vsns drops below a threshold of about 70 mV, illustrated by a dashed line. This dropping of the sense voltage Vsns below the threshold is used to detect the zero crossings, e.g., using a comparator. Alternatively or in addition, the zero crossings could be detected by using a comparator to detect that a rising edge of the sense voltage Vsns exceeds the threshold.

The closing of the switch 151 can be triggered by expiry of a timer which is controlled on the basis of the detected phase of the AC signal Vac. This may involve that the timer is configured with a duration corresponding to half of the period of the AC signal Vac minus a margin of about 5-10%, and that the timer restarted each time when a new zero crossing is detected. Also the reopening of the switch 151 can be controlled by a timer, e.g., started when closing the switch 151. Further, reopening of the switch 151 could be triggered when the sense voltage Vsns exceeds the above-mentioned threshold.

Figure 3:
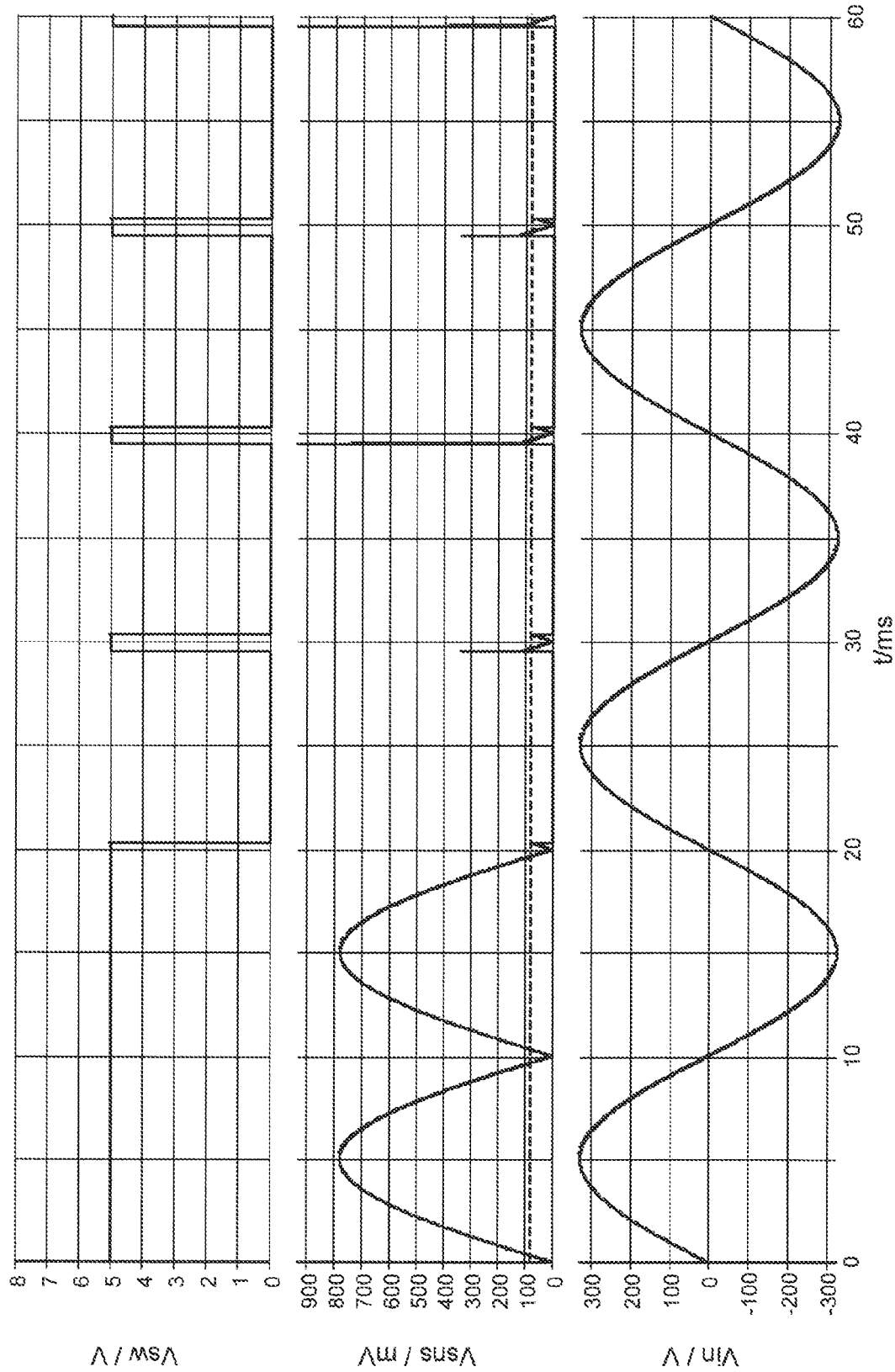
FIG. 3 shows a further example of signals which may occur during operation of the power supply circuit.

FIG. 3 shows an example of signals which may occur during startup operation of the power supply circuit 100. In the example of FIG. 3, it is assumed that the AC source 10 is connected to the power supply circuit 100 and that the control logic 155 first needs to detect the phase of the AC signal Vac, before it can proceed to controlling the switch 151 as explained in connection with FIG. 2. Similar to FIG. 2, FIG. 3 shows the input signal Vin, which corresponds to the AC signal Vac, the sense voltage Vsns, and the switch control voltage Vsw as a function of time t. Again, it is assumed that the AC signal Vac has a frequency of 50 Hz and a peak-to-peak amplitude of about 320 V.

As illustrated in FIG. 3, a startup period is configured for enabling the control logic 155 to detect the phase of the AC signal Vac. In the illustrated example, the startup period extends over two half waves of the AC signal. During the startup period, the control logic 155 keeps the switch 151 closed. Accordingly, the control logic 155 can detect a first zero crossing at t=10 ms by detecting that the sense voltage Vsns drops below the threshold voltage, again illustrated by a dashed line, and/or by detecting that a rising edge of the sense voltage Vsns exceeds the threshold. By detecting the next zero crossing at t=20 ms in a similar manner, the control logic 155 can also determine the period of the AC signal Vac and use the times of the detected zero crossings and the determined period to determine when zero crossings are expected in the future, in the illustrated example at t=30 ms, t=40 ms, t=50 ms, and t=60 ms. It is noted that in scenarios where the period or frequency of the AC signal is known, detecting a single zero crossing may be sufficient to determine when zero crossings are expected in the future. Synchronized to the times of the expected zero crossings, the control logic temporarily closes the switch 151, as explained in connection with FIG. 2, and detects the zero crossings at these times to confirm that the AC signal Vac is still present. Accordingly, once the control logic 155 has detected the phase and thus locked to the AC signal Vac, each detected new zero crossing can be used to newly determine when the next zero crossing is expected. In this way, it is also possible to dynamically take into account variations in the phase and/or frequency of the AC signal Vac.

Figure 4:
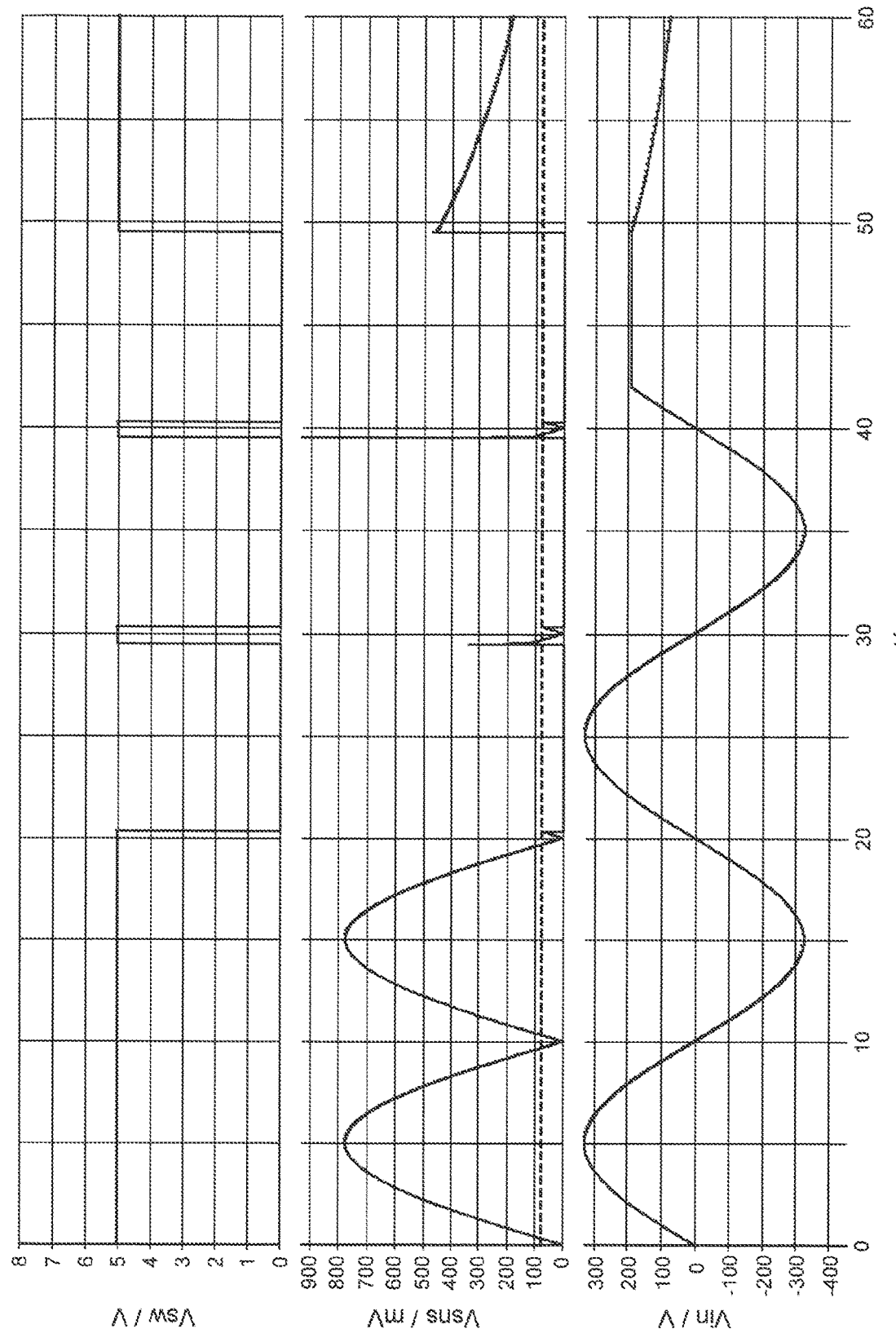
FIG. 4 shows a further example of signals which may occur during operation of the power supply circuit.

FIG. 4 shows an example of signals which may occur during operation of the power supply circuit 100 when the AC source is disconnected. The example of FIG. 4 it is assumed that the AC source 10 is initially connected to the power supply circuit 100 and that the control logic 155 first needs to detect the phase of the AC signal Vac, before it can proceed to controlling the switch 151 as explained in connection with FIG. 2. Accordingly, the example of FIG. 4 involves a similar startup period as explained in connection with FIG. 3. Similar to FIGS. 2 and 3, FIG. 4 shows the input signal Vin, which initially corresponds to the AC signal Vac, the sense voltage Vsns, and the switch control voltage Vsw as a function of time t. Again, it is assumed that the AC signal Vac has a frequency of 50 Hz and a peak-to-peak amplitude of about 320 V.

In the example of FIG. 4, it is assumed that at t=42 ms the power supply circuit 100 is disconnected from the AC source 10. As illustrated, this has the effect the input signal Vin no longer follows the AC waveform of the AC signal Vac. Due to the charge stored in the filter capacitor Cx, the input voltage Vin first remains at a substantially constant value, until the switch 151 is opened to monitor the next expected zero crossing at t=50 ms. The filter capacitor Cx then starts to discharge through the resistors R1 and R2, resulting in a decrease of the input voltage Vin an sense voltage Vsns. Since the sense voltage Vns does not drop below the threshold, the control logic 155 detects that the zero crossing of the AC signal expected at t=50 ms is missing. Accordingly, the control logic 155 keeps the switch 151 closed to continue discharging of the filter capacitor Cx. The speed of discharging depends on the resistance values of the resistors R1, R2. As can be seen, these can be dimensioned to ensure that within time period corresponding to a few cycles of the AC signal Vac, typically within less than 50 ms the filter capacitor Cx is discharged sufficiently to avoid that endangering a person which touches one of the terminals 111, 112.

Figure 5:
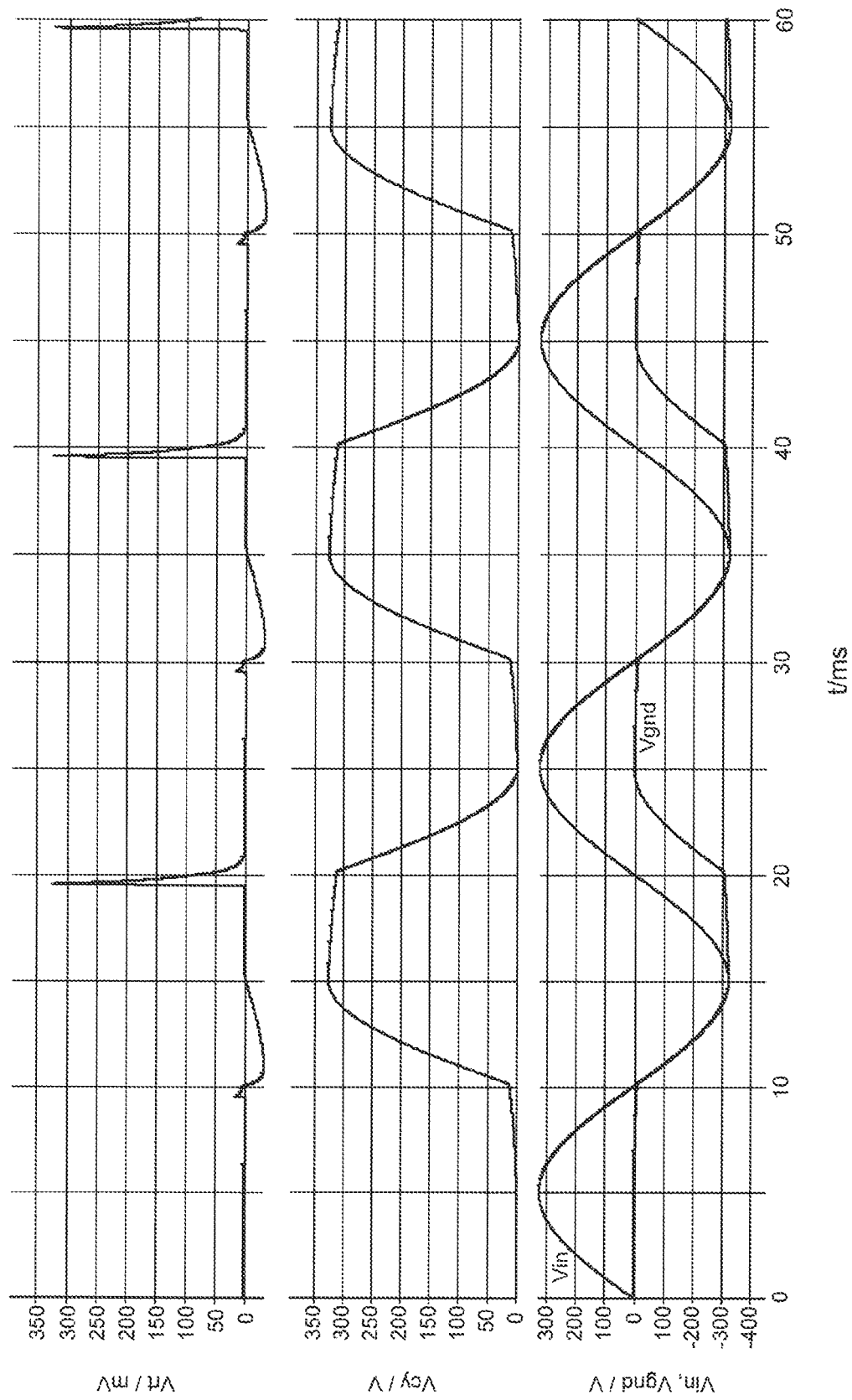
FIG. 5 shows a further example of signals which may occur during operation of the power supply circuit.

As mentioned above, the power supply circuit 100 may include further capacitive elements which are charged during normal operation of the power supply circuit 100, such as the above-mentioned capacitive element Cy. FIG. 5 shows an example of signals for illustrating that also the charging of the capacitance Cy may cause a security risk.

In the example of FIG. 5, it is assumed that the AC source 10 is connected to the power supply circuit 100 and that the control logic 155 monitors the AC signal Vac during time periods which are synchronized to expected zero crossings of the AC signal, as explained in connection with FIG. 2. FIG. 5 shows the input signal Vin, which corresponds to the AC signal Vac, the internal ground voltage Vgnd referred to earth ground, a voltage Vcy across the capacitance Cy, and a voltage Vrt across a resistor Rt. The resistor Rt is also illustrated in FIG. 1 and represents the body of a person touching the ground terminal 113 of the output of the power supply circuit 100 or a component connected thereto, such as a device chassis or a shielding. As above, the example of FIG. 5 assumes that the AC signal Vac has a frequency of 50 Hz and a peak-to-peak amplitude of about 320 V, corresponding to a 230V AC mains voltage as for example used in many European countries. Further, the example of FIG. 5 assumes that only a light load or no load is connected to the output of the power supply circuit 100.

Due to the load on the output of the power supply circuit 100 being low, the rectifier circuit 130 will conduct only during the peaks of the AC signal Vac. Because the ground terminal 111 is connected to earth ground, the internal ground voltage Vgnd referred to earth ground is zero during a positive half wave of the AC signal Vac and drops to the negative peak voltage of −320V during the negative half wave of the AC signal Vac. The capacitance Cy is charged accordingly, as shown by the voltage Vcy. This may have the effect that when the switch 151 is closed at times of expected zero crossings of the AC signal Vac, the capacitive element Cy is discharged through the resistor Rt, i.e., through the body of a person touching the ground terminal 113 or a component connected thereto. As shown peaks in by the voltage Vrt, this may cause a noticeable current flow which might violate touch current limits given in typical security standards. A similar effect may also occur if the switched capacitor circuit 141 operates in a pulsed mode or burst mode and starts to conduct current close to a zero crossing of the AC signal Vac, while the capacitive element Cy is still charged.

Figure 6:
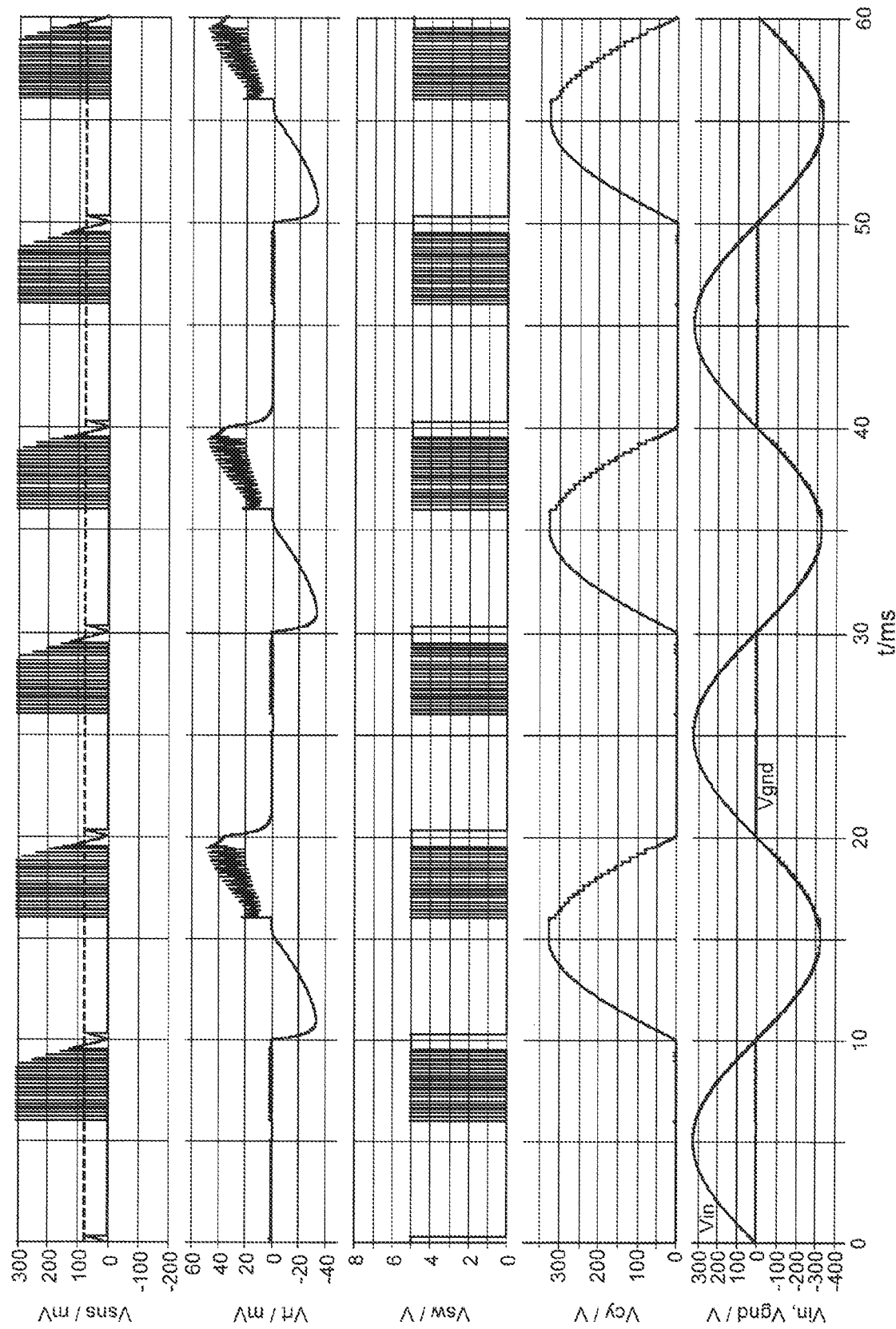
FIG. 6 shows a further example of signals which may occur during operation of the power supply circuit.

In the power supply circuit 100, the security risks due to charging of the capacitive element Cy may be avoided by closing the discharge path in multiple distinct time intervals which are arranged between a minimum value of the AC signal Vac and the next zero crossing. An example of this behavior is illustrated in FIG. 6. Similar to FIG. 5, FIG. 6 shows the input signal Vin, which corresponds to the AC signal Vac, the internal ground voltage Vgnd referred to earth ground, the voltage Vcy across the capacitive element Cy, and the voltage Vrt across a resistor Rt. Further, FIG. 6 shows the switch control voltage Vsw and the sense voltage Vsns.

As illustrated in FIG. 6, the control logic 155 generates the switch control signal Vsw with multiple short pulses between the negative peak value of the AC signal Vac and the next zero crossing of the AC signal Vac. Accordingly, the discharge path through the resistors R1, R2 is activated in a pulse like manner, causing the capacitive element Cy to discharge in multiple distinct time intervals. The discharging of the capacitive element Cy is thus actively enforced and distributed over time. On the other hand, because it is avoided to keep the discharge path continuously active, excessive power consumption can be avoided.

As can be seen from the voltage Vcy, the capacitive element Cy is discharged in a step like manner, and the internal ground voltage Vgnd closely follows the negative half wave of the AC signal Vac. As a result, when the switch 151 is closed at a zero crossing of the AC signal Vac, the capacitance Cy is already discharged, and significant peak currents through the resistor Rt can be avoided, as also shown by the voltage Vrt.

As alternative or in addition to the above-mentioned pulsed activation of the discharge path, it would also be possible to configure the discharge path with a current limiter. For example, such current limiter could be integrated within the switch 151. Immediately after closing the switch 151, the switch 151 could be in a high resistance mode, providing a resistance which is sufficiently high, e.g., above 100 kΩ, to limit the current flowing through the resistor Rt to a harmless level. Then the switch 151 could change to a low resistance mode to thereby reduce power consumption and speed up the above-mentioned discharging of the filter capacitor Cx.

Figure 7:
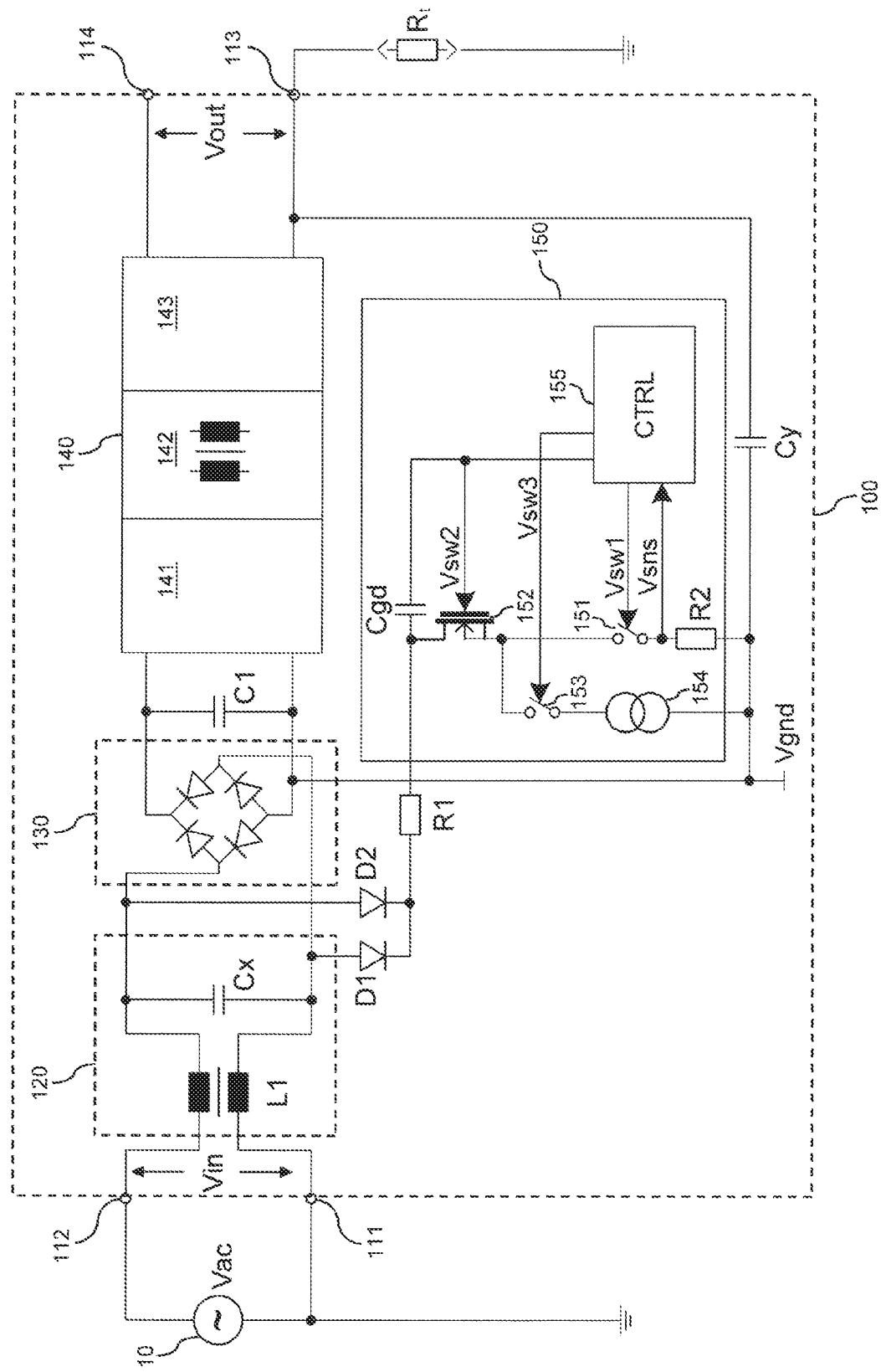
FIG. 7 illustrates a power supply circuit having a control circuit according to a further embodiment.

FIG. 7 shows a further example of implementing the discharge path of the power supply circuit 100 with a current limiter. As illustrated, in this example the discharge path includes, in addition to the resistors R1, R2 and the switch 151, a depletion transistor 152, a further switch 153, and a current sink 154. The depletion transistor 152 is connected in series between the resistor R1 and the switch 151. The further switch 153 and the current sink 154 form an auxiliary discharge path which is connected in parallel to the switch 151 and the resistor R2. In the example of FIG. 7, the switch is controlled by a first switch control voltage Vsw1, in a similar manner as described above for the switch control voltage Vsw. The depletion transistor 152 is controlled by a second switch control voltage Vsw2. The second switch control voltage is generated by the control logic 155 to bring the depletion transistor 152 into a non-conductive state while the switch 151 is open. If the switch 151 and depletion transistor 152 are in the conductive state, a voltage divider is formed by the resistors R1 and R2 which allows to monitor the input signal Vin for presence of the AC signal Vac. For discharging the filter capacitor Cx the depletion transistor 152 is brought into the conductive state and the switch 151 is closed. To limit the touch current which may occur when the depletion transistor 152 is brought into the conductive state and the switch 151 is closed, the auxiliary discharge path with the current sink is activated first, i.e., before closing the switch 151, by closing the further switch 153. In this way, the capacitive element Cy first discharges with a limited current determined by the current sink 154. By corresponding dimensioning of the current sink 154, this current is selected to be lower than the maximum allowable touch current, which is typically 0.25 mA. After a certain time interval, the further switch 153 is opened and the switch 151 closed. This time interval is selected to allow sufficient discharging of the capacitive element Cy by the limited current and may for example be in the range of about 1 ms. Accordingly, the discharge path may be implemented with three states: an off state with no current flow through the discharge path, a current limiting state in which the current flowing through the discharge path is limited to less than the maximum allowable touch current, and an on state in which the current passes through the resistor R2 to enable quick discharging of the filter capacitor Cx and monitoring of the input voltage Vin. A typical sequence of controlling the discharge path would be to first switch from the off state to the current limiting state, then to the on state, and then back to the off state.

Figure 8:
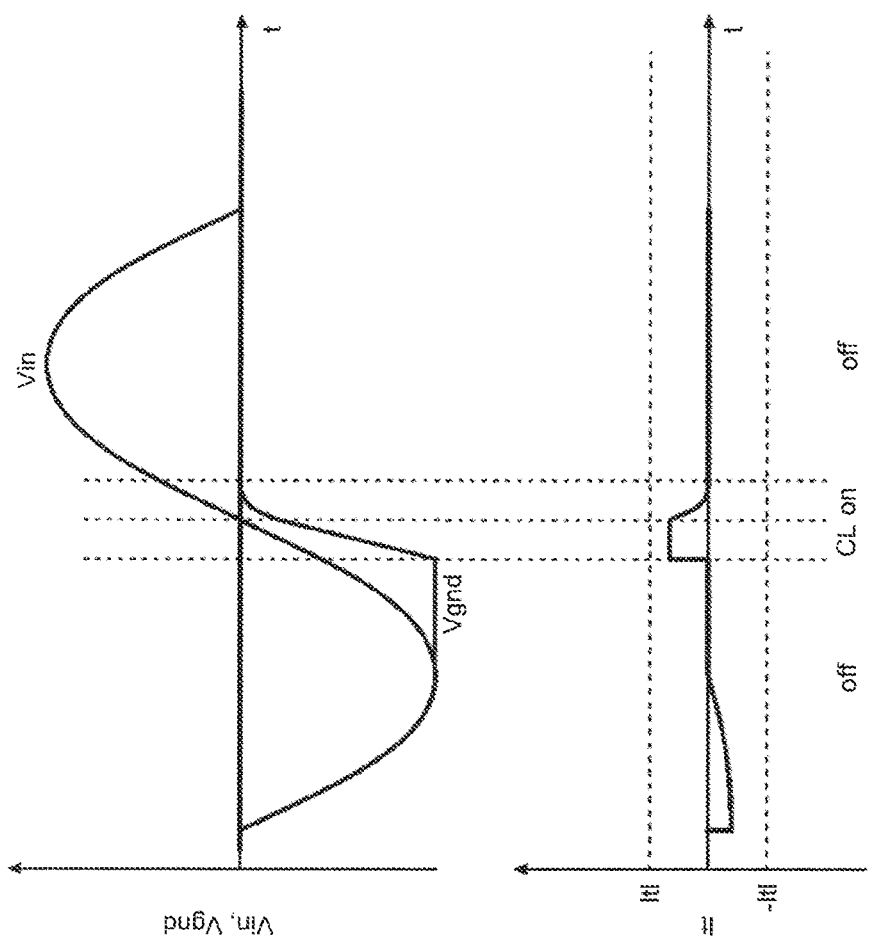
FIG. 8 shows a further example of signals which may occur during operation of the power supply circuit.

Corresponding control of the auxiliary discharge path and the achieved limitation of the touch current It to values below the maximum allowable touch current Itl is illustrated in FIG. 8. An alternative sequence of controlling the discharge path could involve that the discharge path is first switched from the off state to the current limiting state, then to the on state, then back to the current limiting state, and then back to the off state.

While in the current limiting state the current sink 154 is connected in series with the depletion transistor 152, no specific control of the gate of the depletion transistor 152, i.e., of the second switch control voltage Vsw2 is required because the current flowing through the auxiliary discharge path and the depletion transistor 152 is defined by the current sink 154.

The current sink 154 may be configured as a current sink with a constant current value. However, in some implementations the current sink could also be configured to as a current sink with a ramp shaped current, i.e., with a current value which changes as a function of time. This may help to reduce EMI emissions. For example, when activating the auxiliary discharge path before switching to the on state, the current value of the current sink could increase in a linear manner, until reaching a maximum value which is below the maximum allowable touch current. Similarly, when activating the auxiliary discharge path before switching back to the off state, the current value of the current sink could decrease in a linear manner, starting from a maximum value which is below the maximum allowable touch current.

In addition to or as an alternative to using the auxiliary discharge path with the current sink 154, it is also possible to implement the current limiter by controlling the second switch control voltage Vsw2 which is provided to the depletion transistor 152. If the gate of the depletion transistor 152 is driven at very low current, the voltage slope of the switch control voltage Vsw2 is limited by the Miller effect which depends on the ratio of gate current to drain-gate capacitance. To achieve the desired current limiting effect, this ratio may be set to be smaller than the ratio of the maximum allowed touch current to the value of the capacitance Cy. In some implementations a capacitor Cgd may be connected between the gate and drain of the depletion transistor 152 to increase the Miller effect and linearize the voltage slope.

Figure 9:
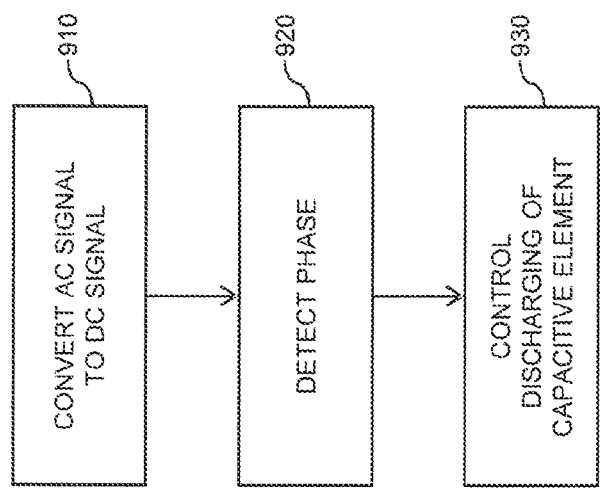
FIG. 9 is flowchart illustrating a method according to an embodiment.

FIG. 9 shows a flowchart for illustrating a method of controlling a power supply circuit, such as the above-mentioned power supply circuit 100. The method may be used for implementing the above-mentioned control of discharging of an internal capacitive element of the power supply circuit.

At 910, an AC signal applied at an input of the power supply circuit, such as the above-mentioned AC signal Vac, is converted into a DC signal. The DC signal may have a lower voltage level than the AC signal. For example, the DC voltage of the DC signal may be lower than an effective voltage of the AC signal. The conversion of block 910 may be accomplished by a converter circuit of the power supply circuit. The converter circuit may for example include a rectifier circuit, such as the above-mentioned rectifier circuit 130, and a DC-DC converter circuit, such as the above-mentioned DC-DC converter circuit 140.

At 920, a phase of the AC signal is detected. This may be accomplished by a control circuit, such as the above-mentioned control circuit 150. The phase may be detected by monitoring zero crossings of the alternating current signal. This may for example involve deriving a sense voltage from an input signal of the power supply circuit, e.g., by using a sense resistor, and comparing this sense voltage to a threshold. An example of such sense voltage is the above-mentioned sense voltage Vsns. An example of such sense resistor is the above-mentioned sense resistor R2.

At 930, discharging of an internal capacitive element of the power supply circuit is controlled based on the detected phase, e.g., by a control circuit, such as the above-mentioned control circuit 150. This may for example involve synchronizing sensing of the AC signal with expected zero crossings of the AC signal, e.g., as explained in connection with FIGS. 2 and 3. Such sensing of the AC signal may involve that in a first time interval, in which a zero crossing of the AC signal is expected, a sense resistor is coupled to the input of the power supply circuit, while in a second time interval, in which no zero crossing of the AC signal is expected, the sense resistor is decoupled from the input of the power supply circuit. An example of such sense resistor is the above-mentioned sense resistor R2.

When using the sense resistor, the discharging of the internal capacitive element may include coupling of the sense resistor to the input of the power supply circuit. The internal capacitive element may thus discharge through the sense resistor.

The internal capacitive element may include a filter capacitor coupled between a first terminal and a second terminal of the input of the power supply circuit. An example of such filter capacitor is the above-mentioned filter capacitor Cx, which is coupled between the terminals 111, 112. In this case, discharging of the filter capacitor may be triggered in response to not detecting an expected zero crossing of the AC signal, e.g., as explained in connection with FIG. 4.

In some scenarios, the DC signal may be provided to an output of the power supply circuit, and the internal capacitive element may include a capacitive element between a terminal of the output of the power supply circuit, e.g., a ground terminal of the output, such as the above-mentioned terminal 113, and an internal ground of the power supply circuit. An example of such capacitive element is the above-mentioned capacitive element Cy, which is coupled between the terminal 113 and the internal ground Vgnd of the power supply circuit 100. The capacitive element between the terminal of the output of the power supply circuit and the internal ground of the power supply circuit may include a filter capacitor coupled between the terminal of the output of the power supply circuit. Alternatively or in addition, the capacitive element between the terminal of the output of the power supply circuit and the internal ground of the power supply circuit may include a parasitic capacitance.

Based on the detected phase of the AC signal, discharging of the capacitive element between the terminal of the output of the power supply circuit and the internal ground of the power supply circuit may be triggered in multiple distinct time intervals arranged between a minimum value and a zero crossing of the AC signal, e.g., as explained in connection with FIG. 6. The capacitive element between the terminal of the output of the power supply circuit and the internal ground of the power supply circuit may be discharged by coupling the internal ground of the power supply circuit to a ground terminal of the input of the power supply circuit. In the above-mentioned power supply circuit 100, this is achieved by activating the discharge path by closing the switch 151. Accordingly, the capacitive element between the terminal of the output of the power supply circuit and the internal ground of the power supply circuit may be discharged through a sense resistor which is used for monitoring of zero crossings of the AC signal.

In some scenarios, the capacitive element between the terminal of the output of the power supply circuit and the internal ground of the power supply circuit through a current limiting switch circuit, e.g., as formed of the switch 151, the depletion transistor 152, the further switch 153, and the current sink 154 in FIG. 7. The current limiting switch circuit may include a current sink. In this case, current limitation may be achieved by selectively switching the current sink into a discharge path of the capacitive element between the terminal of the output of the power supply circuit and the internal ground of the power supply circuit.

It is to be understood that embodiments as explained above may be subject to various modifications. For example, the pulsed discharging of the capacitive element Cy could be used independently of the active discharging of the filter capacitor Cx. Further, the illustrated concepts could be applied in connection with various types of power supply circuits, without limitation to power supply circuits based on a bridge rectifier or on switched capacitor based voltage conversion.

At least some embodiments are defined by the examples given below:

Example 1

A control circuit for a power supply circuit having a converter circuit configured to convert an alternating current signal applied at an input of the power supply circuit into a direct current signal, the power supply circuit comprising an internal capacitive element coupled to at least an input or output of the power supply circuit, and the control circuit being configured to:

detect a phase of the alternating current signal, and based on the detected phase, control discharging of the internal capacitor.

Example 2

The control circuit according to example 1, the control circuit being configured to detect the phase by monitoring zero crossings of the alternating current signal.

Example 3

The control circuit according to example 1 or 2, the control circuit being further configured to synchronize sensing of the alternating current signal with expected zero crossings of the alternating current signal.

Example 4

The control circuit according to example 3, said sensing of the alternating current signal comprising:
  in a first time interval in which a zero crossing of the alternating current signal is expected, coupling a sense resistor to the input of the power supply circuit; and
  in a second time interval in which no zero crossing of the alternating current signal is expected, decoupling the sense resistor from the input of the power supply circuit.

Example 5

The control circuit according to example 4, said discharging of the internal capacitive element comprising coupling of the sense resistor to the input of the power supply circuit.

Example 6

The control circuit according to any one of the preceding examples, wherein the internal capacitive element comprises a filter capacitor coupled between a first terminal and a second terminal of the input of the power supply circuit.

Example 7

The control circuit according to example 6, the control circuit being configured to trigger discharging of the filter capacitor in response to not detecting an expected zero crossing of the alternating current signal.

Example 8

The control circuit according to any one of the preceding examples, the converter circuit being configured to provide the direct current signal to an output of the power supply circuit; and the internal capacitive element comprising a capacitive element between a terminal of the output of the power supply circuit and an internal ground of the power supply circuit.

Example 9

The control circuit according to example 8, the capacitive element between the terminal of the output of the power supply circuit and the internal ground of the power supply circuit comprising a filter capacitor coupled between the terminal of the output of the power supply circuit and the internal ground of the power supply circuit and/or a parasitic capacitance.

Example 10

The control circuit according to example 8 or 9, the control circuit being configured to trigger discharging of the capacitance between the terminal of the output of the power supply circuit and the internal ground of the power supply circuit in multiple distinct time intervals arranged between a minimum value and a zero crossing of the alternating current signal.

Example 11

The control circuit according to example 10, the control circuit being configured to discharge the capacitive element between the terminal of the output of the power supply circuit and the internal ground of the power supply circuit by coupling the internal ground of the power supply circuit to a ground terminal of the input of the power supply circuit.

Example 12

The control circuit according to any one of examples 8 to 11, the control circuit being configured to discharge the capacitive element between the terminal of the output of the power supply circuit and the internal ground of the power supply circuit through a current limiting switch circuit.

Example 13

The control circuit according to any one of examples 8 to 11, wherein the current limiting switch circuit comprises a current sink configured to be selectively switched into a discharge path of the capacitive element between the terminal of the output of the power supply circuit and the internal ground of the power supply circuit.

Example 14

A power supply circuit, comprising:
  a control circuit according to any one of the preceding examples; and the converter circuit.

Example 15

A method of controlling a power supply circuit, the method comprising:
  converting an alternating current signal applied at an input of the power supply circuit into a direct current signal having a lower voltage level than the alternating current signal;
  detecting a phase of the alternating current signal, and based on the detected phase, controlling discharging of an internal capacitive element of the power supply circuit.

Example 16

The method according to example 15, comprising:
  detecting the phase by monitoring zero crossings of the alternating current signal.

Example 17

The method according to example 15 or 16, comprising:
  synchronizing sensing of the alternating current signal with expected zero crossings of the alternating current signal.

Example 18

The method according to example 16, said sensing of the alternating current signal comprising:

in a first time interval in which a zero crossing of the alternating current signal is expected, coupling a sense resistor to the input of the power supply circuit; and in a second time interval in which no zero crossing of the alternating current signal is expected, decoupling the sense resistor from the input of the power supply circuit.

Example 19

The method according to example 18, wherein said discharging of the internal capacitor comprises coupling of the sense resistor to the input of the power supply circuit.

Example 20

The method according to any one of examples 15 to 19, the internal capacitive element comprising a filter capacitor coupled between a first terminal and a second terminal of the input of the power supply circuit.

Example 21

The method according to example 20, comprising: triggering discharging of the filter capacitor in response to not detecting an expected zero crossing of the alternating current signal.

Example 22

The method according to any one of examples 15 to 21, the direct current signal being provided to an output of the power supply circuit; and the internal capacitor comprising a capacitor between a terminal of the output of the power supply circuit and an internal ground of the power supply circuit.

Example 23

The method according to example 22, the capacitor between the terminal of the output of the power supply circuit and the internal ground of the power supply circuit comprising a filter capacitor coupled between the terminal of the output of the power supply circuit and the internal ground of the power supply circuit and/or a parasitic capacitance.

Example 24

The method according to example 22 or 23, comprising: triggering discharging of the capacitive element between the terminal of the output of the power supply circuit and the internal ground of the power supply circuit in multiple distinct time intervals arranged between a minimum value and a zero crossing of the alternating current signal.

Example 25

The method circuit according to example 23, comprising: discharging the capacitive element between the terminal of the output of the power supply circuit and the internal ground of the power supply circuit by coupling the internal ground of the power supply circuit to a ground terminal of the input of the power supply circuit.

Example 26

The method circuit according to any one of examples 22 to 25, comprising:
discharging the capacitive element between the terminal of the output of the power supply circuit and the internal ground of the power supply circuit through a current limiting switch circuit.

Example 27

The method according to example 26, wherein the current limiting switch circuit comprises a current sink and the method comprises selectively switching the current sink into a discharge path of the capacitive element between the terminal of the output of the power supply circuit and the internal ground of the power supply circuit.

What is claimed is:

1. A control circuit for a power supply circuit having a converter circuit configured to convert an alternating current signal applied at an input of the power supply circuit into a direct current signal, the power supply circuit comprising an internal capacitive element coupled to at least an input or output of the power supply circuit, and
the control circuit being configured to:
detect a phase of the alternating current signal; and
based on the detected phase, control discharging of the internal capacitor,
wherein the control circuit is configured to synchronize sensing of the alternating current signal with expected zero crossings of the alternating current signal,
wherein the sensing of the alternating current signal comprises:
in a first time interval in which a zero crossing of the alternating current signal is expected, coupling a sense resistor to the input of the power supply circuit; and
in a second time interval in which no zero crossing of the alternating current signal is expected, decoupling the sense resistor from the input of the power supply circuit.

2. The control circuit of claim 1, wherein the control circuit is configured to detect the phase by monitoring zero crossings of the alternating current signal.

3. The control circuit of claim 1, wherein the discharging of the internal capacitive element comprises coupling of the sense resistor to the input of the power supply circuit.

4. The control circuit of claim 1, wherein the internal capacitive element comprises a filter capacitor coupled between a first terminal and a second terminal of the input of the power supply circuit.

5. The control circuit of claim 4, wherein the control circuit is configured to trigger discharging of the filter capacitor in response to not detecting an expected zero crossing of the alternating current signal.

6. The control circuit of claim 1, wherein the converter circuit is configured to provide the direct current signal to an output of the power supply circuit, and wherein the internal capacitive element comprises a capacitive element between a terminal of the output of the power supply circuit and an internal ground of the power supply circuit.

7. The control circuit of claim 6, wherein the capacitive element between the terminal of the output of the power supply circuit and the internal ground of the power supply circuit comprises a filter capacitor coupled between the terminal of the output of the power supply circuit and the internal ground of the power supply circuit and/or a parasitic capacitance.

8. The control circuit of claim 6, wherein the control circuit is configured to trigger discharging of the capacitance between the terminal of the output of the power supply circuit and the internal ground of the power supply circuit in multiple distinct time intervals arranged between a minimum value and a zero crossing of the alternating current signal.

9. The control circuit of to claim 8, wherein the control circuit is configured to discharge the capacitive element between the terminal of the output of the power supply circuit and the internal ground of the power supply circuit by coupling the internal ground of the power supply circuit to a ground terminal of the input of the power supply circuit.

10. The control circuit of claim 6, wherein the control circuit is configured to discharge the capacitive element between the terminal of the output of the power supply circuit and the internal ground of the power supply circuit through a current limiting switch circuit.

11. The control circuit of claim 6, wherein the current limiting switch circuit comprises a current sink configured to be selectively switched into a discharge path of the capacitive element between the terminal of the output of the power supply circuit and the internal ground of the power supply circuit.

12. A power supply circuit comprising the control circuit of claim 1.

13. A method of controlling a power supply circuit, the method comprising:
   converting an alternating current signal applied at an input of the power supply circuit into a direct current signal having a lower voltage level than the alternating current signal;
   detecting a phase of the alternating current signal; and
   based on the detected phase, controlling discharging of an internal capacitive element of the power supply circuit,
   wherein detecting the phase of the alternating current signal comprises monitoring zero crossings of the alternating current signal,
   wherein the monitoring of the zero crossings of the alternating current signal comprises:
     in a first time interval in which a zero crossing of the alternating current signal is expected, coupling a sense resistor to the input of the power supply circuit; and
     in a second time interval in which no zero crossing of the alternating current signal is expected, decoupling the sense resistor from the input of the power supply circuit.

14. The method of claim 13, further comprising:
   synchronizing sensing of the alternating current signal with expected zero crossings of the alternating current signal.

15. The method of claim 13, wherein the discharging of the internal capacitor comprises coupling of the sense resistor to the input of the power supply circuit.

16. The method of claim 13, wherein the internal capacitive element comprises a filter capacitor coupled between a first terminal and a second terminal of the input of the power supply circuit.

17. The method of claim 16, further comprising:
   triggering discharging of the filter capacitor in response to not detecting an expected zero crossing of the alternating current signal.

18. The method of claim 13, wherein the direct current signal is provided to an output of the power supply circuit, and wherein the internal capacitor comprises a capacitor between a terminal of the output of the power supply circuit and an internal ground of the power supply circuit.

19. The method of claim 18, wherein the capacitor between the terminal of the output of the power supply circuit and the internal ground of the power supply circuit comprises a filter capacitor coupled between the terminal of the output of the power supply circuit and the internal ground of the power supply circuit and/or a parasitic capacitance.

20. The method of claim 18, further comprising:
   triggering discharging of the capacitive element between the terminal of the output of the power supply circuit and the internal ground of the power supply circuit in multiple distinct time intervals arranged between a minimum value and a zero crossing of the alternating current signal.

21. The method of claim 19, further comprising:
   discharging the capacitive element between the terminal of the output of the power supply circuit and the internal ground of the power supply circuit by coupling the internal ground of the power supply circuit to a ground terminal of the input of the power supply circuit.

22. The method of claim 18, further comprising:
   discharging the capacitive element between the terminal of the output of the power supply circuit and the internal ground of the power supply circuit through a current limiting switch circuit.

23. The method of claim 22, wherein the current limiting switch circuit comprises a current sink and the method further comprises:
   selectively switching the current sink into a discharge path of the capacitive element between the terminal of the output of the power supply circuit and the internal ground of the power supply circuit.

24. A control circuit for a power supply circuit having a converter circuit configured to convert an alternating current signal applied at an input of the power supply circuit into a direct current signal, the power supply circuit comprising an internal capacitive element coupled to at least an input or output of the power supply circuit, and
   the control circuit being configured to:
     detect a phase of the alternating current signal; and
     based on the detected phase, control discharging of the internal capacitor,
     wherein the internal capacitive element comprises a filter capacitor coupled between a first terminal and a second terminal of the input of the power supply circuit,
     wherein the control circuit is configured to trigger discharging of the filter capacitor in response to not detecting an expected zero crossing of the alternating current signal.

25. A control circuit for a power supply circuit having a converter circuit configured to convert an alternating current signal applied at an input of the power supply circuit into a direct current signal, the power supply circuit comprising an internal capacitive element coupled to at least an input or output of the power supply circuit, and
   the control circuit being configured to:
     detect a phase of the alternating current signal; and
     based on the detected phase, control discharging of the internal capacitor, wherein the converter circuit is configured to provide the direct current signal to an output of the power supply circuit, wherein the internal capacitive element comprises a capacitive element between a terminal of the output of the power supply circuit and an internal ground of the power supply circuit, wherein the control circuit is configured to trigger discharging of the capacitive element between the terminal of the output of the power supply circuit and the internal ground of the power supply circuit in multiple distinct time intervals arranged between a minimum value and a zero crossing of the alternating current signal.

26. The control circuit of claim 25, wherein the capacitive element between the terminal of the output of the power supply circuit and the internal ground of the power supply circuit comprises a filter capacitor coupled between the terminal of the output of the power supply circuit and the internal ground of the power supply circuit and/or a parasitic capacitance.

27. The control circuit of to claim 25, wherein the control circuit is configured to discharge the capacitive element between the terminal of the output of the power supply circuit and the internal ground of the power supply circuit by coupling the internal ground of the power supply circuit to a ground terminal of the input of the power supply circuit.

28. The control circuit of claim 25, wherein the control circuit is configured to discharge the capacitive element between the terminal of the output of the power supply circuit and the internal ground of the power supply circuit through a current limiting switch circuit.

29. The control circuit of claim 28, wherein the current limiting switch circuit comprises a current sink configured to be selectively switched into a discharge path of the capacitive element between the terminal of the output of the power supply circuit and the internal ground of the power supply circuit.

30. A method of controlling a power supply circuit, the method comprising:
converting an alternating current signal applied at an input of the power supply circuit into a direct current signal having a lower voltage level than the alternating current signal;
detecting a phase of the alternating current signal; and
based on the detected phase, controlling discharging of an internal capacitive element of the power supply circuit,
wherein the internal capacitive element comprises a filter capacitor coupled between a first terminal and a second terminal of the input of the power supply circuit,
wherein the method further comprises:
triggering discharging of the filter capacitor in response to not detecting an expected zero crossing of the alternating current signal.

31. A method of controlling a power supply circuit, the method comprising:
converting an alternating current signal applied at an input of the power supply circuit into a direct current signal having a lower voltage level than the alternating current signal;
detecting a phase of the alternating current signal; and
based on the detected phase, controlling discharging of an internal capacitive element of the power supply circuit,
wherein the direct current signal is provided to an output of the power supply circuit,
wherein the internal capacitive element comprises a capacitor between a terminal of the output of the power supply circuit and an internal ground of the power supply circuit,
the method further comprising:
triggering discharging of the capacitor between the terminal of the output of the power supply circuit and the internal ground of the power supply circuit in multiple distinct time intervals arranged between a minimum value and a zero crossing of the alternating current signal.

32. The method of claim 31, wherein the capacitor between the terminal of the output of the power supply circuit and the internal ground of the power supply circuit comprises a filter capacitor coupled between the terminal of the output of the power supply circuit and the internal ground of the power supply circuit and/or a parasitic capacitance.

33. The method of claim 32, further comprising:
discharging the capacitor between the terminal of the output of the power supply circuit and the internal ground of the power supply circuit by coupling the internal ground of the power supply circuit to a ground terminal of the input of the power supply circuit.

34. The method of claim 31, further comprising:
discharging the capacitor between the terminal of the output of the power supply circuit and the internal ground of the power supply circuit through a current limiting switch circuit.

35. The method of claim 34, wherein the current limiting switch circuit comprises a current sink and the method further comprises:
selectively switching the current sink into a discharge path of the capacitor between the terminal of the output of the power supply circuit and the internal ground of the power supply circuit.

* * * * *

UNITED STATES PATENT AND TRADEMARK OFFICE
CERTIFICATE OF CORRECTION

PATENT NO. : 10,707,745 B2
APPLICATION NO. : 16/005110
DATED : July 7, 2020
INVENTOR(S) : Feldtkeller et al.

Page 1 of 1

It is certified that error appears in the above-identified patent and that said Letters Patent is hereby corrected as shown below:

In the Claims

Column 17, Line 11 (Claim 9), please change "of to claim" to -- of claim --.

Column 19, Line 22 (Claim 27), please change "of to claim" to -- of claim --.

Signed and Sealed this
First Day of September, 2020

Andrei Iancu
*Director of the United States Patent and Trademark Office*